United States Patent [19]
Hara et al.

[11] Patent Number: 5,193,639
[45] Date of Patent: Mar. 16, 1993

[54] FOUR WHEEL DRIVE POWER TRAIN FOR VEHICLE

[75] Inventors: Tomoyuki Hara; Hideki Sado, both of Kanagawa, Japan

[73] Assignee: Nissan Motor Co., Ltd., Yokohama, Japan

[21] Appl. No.: 752,077

[22] Filed: Aug. 29, 1991

[30] Foreign Application Priority Data

Aug. 31, 1990 [JP] Japan .................................. 2-230955

[51] Int. Cl.$^5$ .............................................. B60K 17/348
[52] U.S. Cl. ........................................ 180/248; 180/247
[58] Field of Search ............... 180/233, 245, 247, 248; 192/60

[56] References Cited

U.S. PATENT DOCUMENTS

| | | | |
|---|---|---|---|
| 4,915,190 | 4/1990 | Iwata ..................................... | 180/247 |
| 4,919,248 | 4/1990 | Hiramatsu et al. ............. | 180/248 X |
| 4,921,085 | 5/1990 | Takemura et al. ..................... | 192/60 |
| 4,957,473 | 9/1990 | Takemura et al. ................... | 475/231 |
| 4,958,711 | 9/1990 | Okubo et al. ........................ | 192/60 |
| 5,005,663 | 4/1991 | Niide et al. ...................... | 180/248 X |
| 5,064,017 | 11/1991 | Kikuchi et al. ..................... | 180/248 |
| 5,105,517 | 4/1992 | Barnow ........................... | 180/247 X |

FOREIGN PATENT DOCUMENTS 62-244715 10/1987 Japan .
62-253526 11/1987 Japan .

*Primary Examiner*—Margaret A. Focarino
*Assistant Examiner*—Carla Mattix
*Attorney, Agent, or Firm*—Foley & Lardner

[57] ABSTRACT

A four wheel drive system for a vehicle comprises a transverse power unit, a first (front) differential unit, an angular drive unit for changing the direction of torque path, a propeller shaft, and a second (rear) differential assembly between left and right permanent drive (rear) wheels which are always connected with the power unit through the differential case of the first differential unit, the angular drive unit, the propeller shaft and the second differential assembly. The first differential unit is provided between left and right nonpermanent drive (front) wheels. One of the nonpermanent drive wheels is simply connected with one side gear of the first differential unit by an axle shaft. The other nonpermanent drive wheel is connected with the other side gear of the first differential unit through a coupling unit, such as an orifice coupling, which can vary a driving torque distribution between the front and rear wheels by varying a transmission torque therebetween.

12 Claims, 3 Drawing Sheets

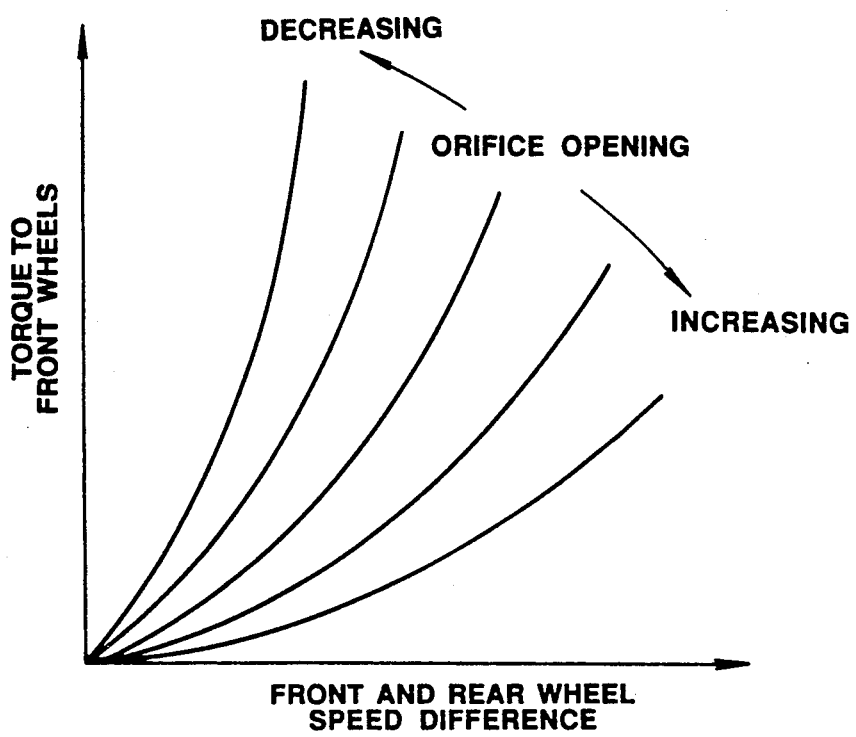

FOUR WHEEL DRIVE POWER TRAIN FOR VEHICLE

BACKGROUND OF THE INVENTION

The present invention relates to a four wheel drive system for a vehicle.

Japanese Patent Provisional (KOKAI) Publications Nos. 62-244715 and 62-253526 disclose four wheel drive for transverse engines.

SUMMARY OF THE INVENTION

It is an object of the present invention to provide a four wheel drive system which is more advantageous to reduction of size, weight and cost.

According to the present invention, a four wheel drive system comprises a transverse power unit, a first differential unit, an angular drive unit, a propeller shaft, first and second side permanent drive wheels, a second differential assembly, first and second nonpermanent drive wheels, a first side nonpermanent drive axle shaft, and a second side nonpermanent drive axle shaft assembly.

The transverse power unit comprises an engine and a transmission. The transverse power unit is transversely mounted at the front or rear of the vehicle. In this sense, the power unit is transverse.

The first differential unit is a gear arrangement disposed between left and right drive wheels to permit one wheel to rotate faster than the other. The first differential unit is drivingly connected with an output member of the transmission. The first differential unit directly receives a driving torque from the power unit. The first differential unit comprises a differential case, and first and second side gears.

The angular drive unit is a means for changing the direction of torque path. The angular drive unit comprises an input member rotatable on an input axis, and an output member rotatable on an output axis which is nonparallel to the input axis. The input member of the angular drive unit is connected with the differential case of the first differential unit, and the output member of the angular drive unit is connected with the propeller shaft. The angular drive unit receives an input rotation from the differential case of the first differential unit, and delivers an output rotation to the propeller shaft. Therefore, torque is transmitted from the power unit through the differential case of the first differential unit, to the angular drive unit. The angular drive unit transmits torque from the input member of the angular unit to the output member of the angular unit. For example, the angular drive unit comprises an angular gear unit.

The second differential assembly is between first and second permanent (regular) drive wheels of the vehicle. For example, the first and second permanent drive wheels are the left and right rear wheels of the vehicle. The permanent drive wheels are always in driving connection with the power unit. The first side (left) permanent drive wheel is connected with a first (left) side gear of the second differential assembly by a first (left) permanent drive axle shaft. The second (right) permanent drive wheel is connected with a second (right) side gear of the second differential assembly by a second (right) permanent drive axle shaft.

The first differential unit is between first and second nonpermanent (supplementary) drive wheels of the vehicle. For example, the first and second nonpermanent drive wheels are the left and right front wheels.

The first side nonpermanent drive wheel (the left front wheel, for example) is connected with a first side gear of the first differential unit by the first nonpermanent drive axle shaft. The second nonpermanent drive wheel (the right front wheel, for example) is connected with a second side gear of the first differential unit by the second nonpermanent drive axle shaft assembly.

The second side nonpermanent drive axle shaft assembly comprises an (inboard) input shaft connected with the second side gear of the first differential unit, an (outboard) output shaft connected with the second side nonpermanent drive wheel (the right front wheel, for example), and a coupling unit for connecting the input and output shafts of the axle assembly and varying a torque transmitted therebetween. Preferably, the coupling unit is an orifice coupling unit, and the angular drive unit is disposed between the first differential unit and the coupling unit.

BRIEF DESCRIPTION OF THE DRAWINGS

FIG. 3 is a graph showing a characteristic of an orifice coupling employed in the embodiment of the invention.

DETAILED DESCRIPTION OF THE INVENTION

Figure 1:
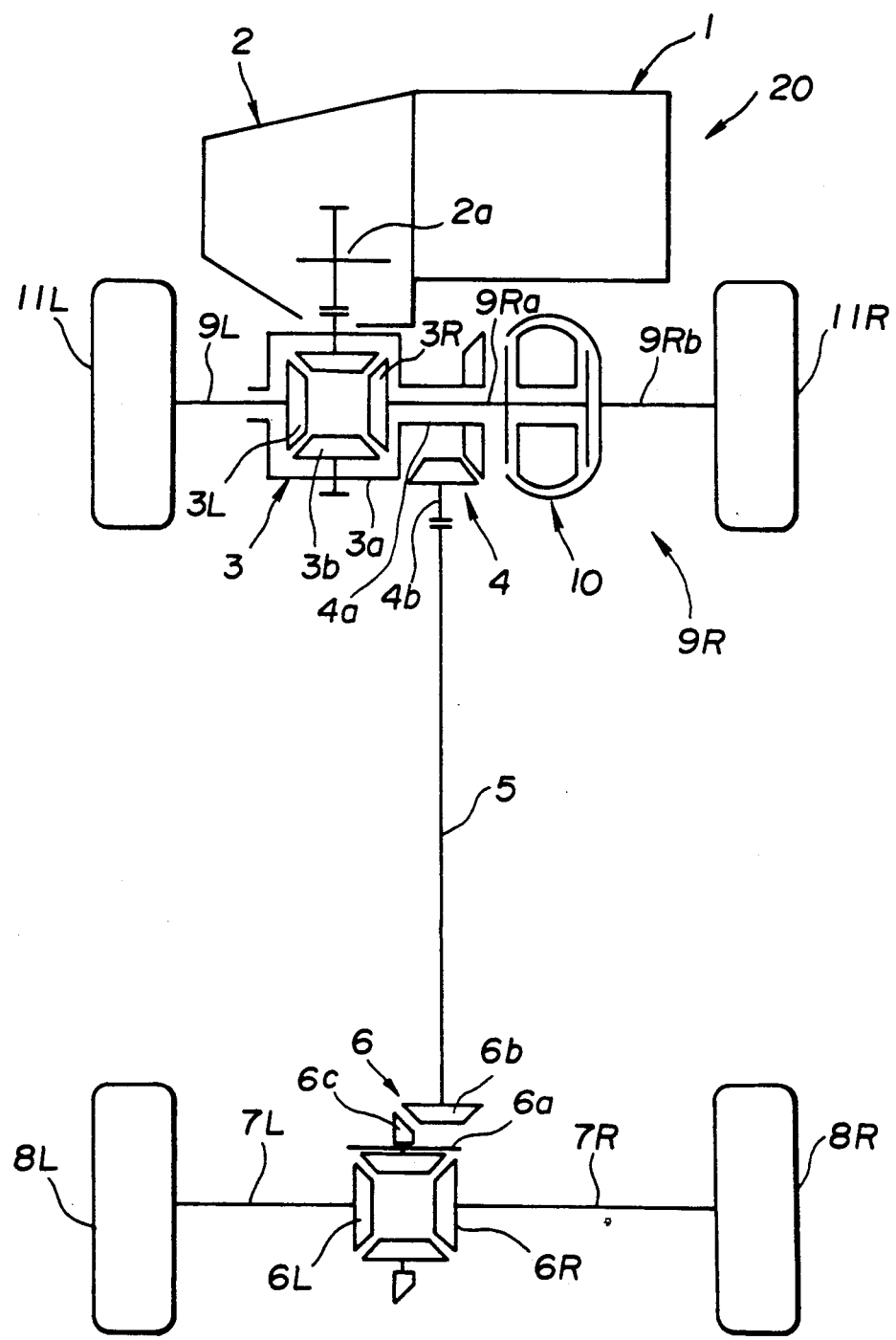
FIG. 1 is a skeleton diagram schematically showing a four wheel drive power train according to one embodiment of the present invention.
Figure 2:
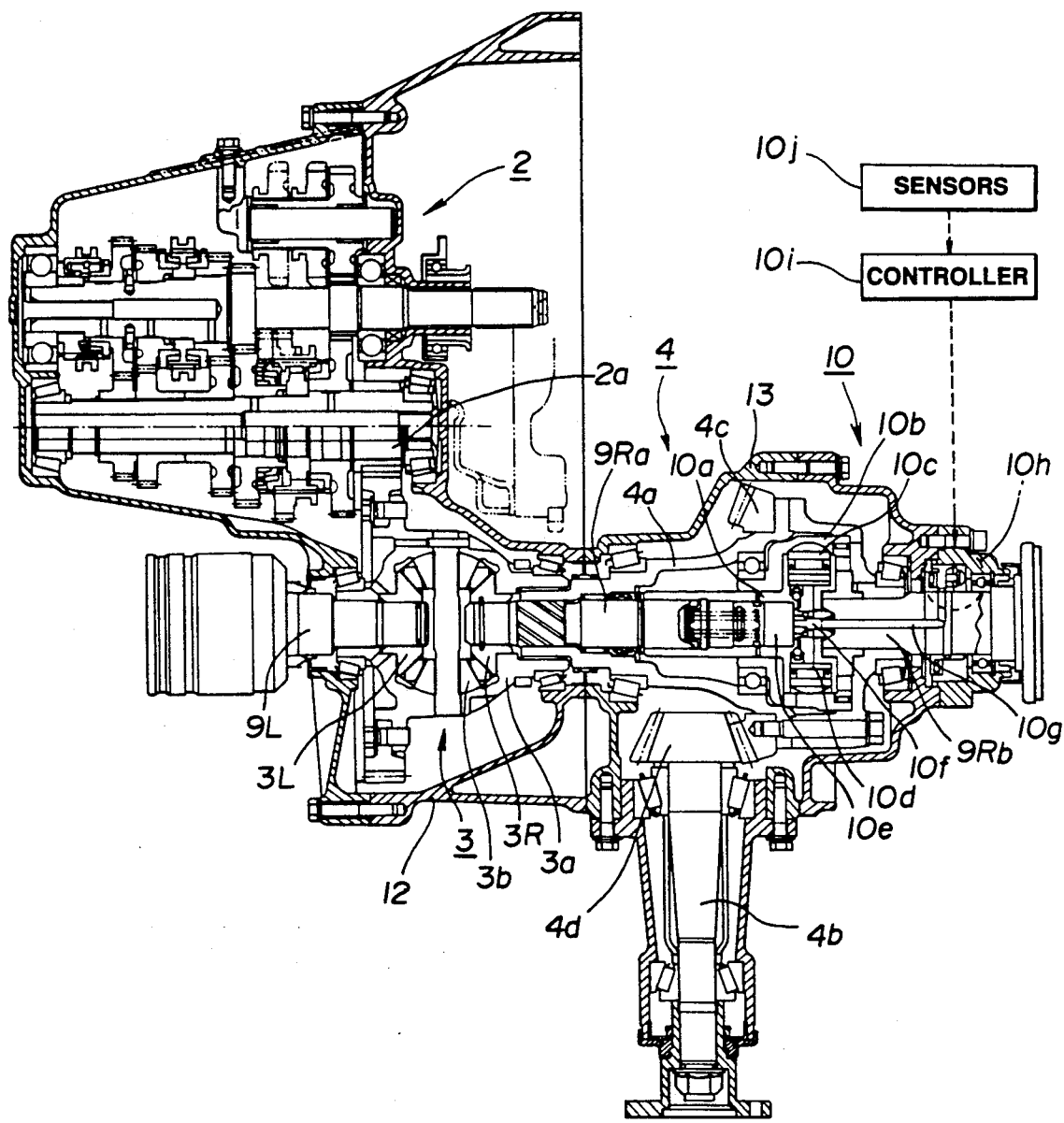
FIG. 2 is a sectional view of a transfer of the embodiment of the invention.

One embodiment of the present invention is shown in FIGS. 1 and 2.

FIG. 1 shows a four wheel drive (4WD) vehicle based on a front engine, front wheel drive (FF) vehicle. The power train of this example has a permanent drive line to left and right rear wheels 8L and 8R, and a nonpermanent drive line to left and right front wheels 11L and 11R which is arranged to vary a driving torque transmitted to the front wheels 11L and 11R. In this embodiment, the rear wheels 8L and 8R of this embodiment are permanent (regular, primary) drive wheels, and the front wheels 11L and 11R are nonpermanent (supplementary) drive wheels. Therefore, this four wheel drive system is put in the rear two wheel drive state when the driving connection between the prime mover and the front wheels 11L and 11R is fully interrupted.

A first fundamental component of the power train shown in FIG. 1 is a transverse power unit (or power plant) 20 which comprises an engine 1 and a transmission 2. The engine 1 is transversely mounted on the vehicle. In this embodiment, the engine 1 is mounted at the front of the vehicle.

A second fundamental component of the power train is a front (first) differential unit 3. The front differential 3 is drivingly connected with a final reduction section (or output member) 2a of the transmission 2. Therefore, a driving torque is transmitted from the engine 1, through the transmission 2, to the front differential 3. The front differential unit 3 has a front differential case 3a, and left and right front side gears 3L and 3R. The front differential case 3a is drivingly connected by gearing with the transmission 2. The front differential case 3a is driven by the output torque of the transmission 2. The front differential case 3a is rotatable on an axis extending laterally of the vehicle. The axis of the output member 2a of the transmission 2 is parallel to the axis of the front differential case 3a. The transmission 2 and the front differential unit 3 are enclosed in a transaxle case 12, as shown in FIG. 2.

A third fundamental component of the power train is an angular (or angle) drive unit 4 for changing the direction of drive path. The angular drive unit 4 is drivingly connected with the front differential case 3a of the front differential unit 3. The angular drive unit 4 has an input hollow shaft 4a and an output shaft 4b. The input shaft 4a is coaxial with the front differential unit 3. The axis of the input shaft 4a is in line with the axis of the front differential case 3a. The common axis of the front differential unit 3 and the input shaft 4a of the angular drive unit 4 is substantially parallel to the body lateral "y" axis (i.e. the pitching axis) of the vehicle. The input shaft 4a is drivingly connected with the front differential case 3a so that the input shaft 4a and the front differential case 3a rotate together. In this embodiment, the hollow input shaft 4a is splined to the front differential case 3a. The angle drive unit 4 is disposed on one side of the front differential unit 3. In this embodiment, the angular drive unit 4 is on the right side of the front differential unit 3. The axis of the output shaft 4b of the angular drive unit 4 is neither parallel nor coincident with the axis of the input shaft 4a. The axis of the output shaft 4b is substantially parallel to the longitudinal "x" (rolling) axis of the vehicle. The angular drive unit 4 of this embodiment is an angular (or angle) gear unit for transmitting motion between two rotating shafts that are not parallel. An input ring gear 4c is fixed to the input shaft 4a. The ring gear 4c is coaxial with the front differential unit 3. An output pinion gear 4d is integral with the output shaft 4b. The ring gear 4c and the pinion gear 4d are in direct contact and direct engagement with each other. A driving torque is transmitted from the transmission 2, through the front differential case 3a, to the angular drive unit 4. In the angular drive unit 4, a torque is transmitted from the input shaft 4a to the output shaft 4b so that the path of torque flow is bent so as to form a right angle.

A fourth fundamental component of the power train is a propeller shaft 5 (also known as a drive shaft). The propeller shaft 5 extends toward the rear of the vehicle along the longitudinal axis of the vehicle. The front end of the propeller shaft 5 is connected with the output shaft 4b of the angular drive unit 4. The propeller shaft 5 is driven by the output shaft 4b of the angular drive unit 4.

A fifth fundamental component of the power train is a rear (second) differential assembly 6 connected with the rear end of the propeller shaft 5. The rear differential assembly 6 has a rear differential case 6a, and left and right rear side gears 6L and 6R. The rear differential unit 6 further includes a drive pinion 6b provided at the rear end of the propeller shaft 5, and a ring gear 6c fixed to the rear differential case 6a. The rear differential assembly 6 divides a torque transmitted through the propeller shaft 5 between the left and right rear wheels 8L and 8R.

First and second lateral side permanent drive axle shafts 7L and 7R are connected, respectively, with the side gears 6L and 6R of the rear differential assembly 6. In this embodiment, the first and second side permanent drive axle shafts 7L and 7R are left and right rear axle shafts. The left and right rear wheels 8L and 8R of the vehicle are connected, respectively, with the outboard ends of the left and right axle shafts 7L and 7R. In this embodiment, the rear wheels 8L and 8R are always connected with the power unit 20 by the front differential case 3a, the angular drive unit 4, the propeller shaft 5, the rear differential assembly 6 and the rear axle shafts 7L and 7R. In this sense, the rear wheels 8L and 8R of this example are permanent drive wheels.

The four wheel drive system further comprises a first lateral side nonpermanent drive axle shaft 9L and a second lateral side nonpermanent drive axle shaft assembly 9R. In this embodiment, the first lateral side is the left side, the second lateral side is the right side, and the front wheels 11L and 11R are nonpermanent drive wheels. Therefore, the first side nonpermanent drive axle shaft 9L is a left front axle shaft, and the second side nonpermanent drive axle shaft assembly is a right front axle shaft assembly. The left front wheel 11L is drivingly connected with the left side gear of the front (first) differential unit 3 by the left front axle shaft 9L.

The right front axle shaft assembly (second side nonpermanent drive axle shaft assembly) 9R is an axle shaft assembly connecting the right front wheel 11R with the right side gear 3R of the front differential unit 3. The right front axle shaft assembly 9R comprises an input shaft 9Ra, an output shaft 9Rb and a coupling unit 10. The input shaft 9Ra is located on the inboard side of the coupling unit 10, and drivingly connected with the right side gear 3R of the front differential unit 3. The output shaft 9Rb is located on the outboard side of the coupling unit 10, and drivingly connected with the right front wheel 11R. The coupling unit 10 connects the output shaft 9Rb with the input shaft 9Ra, and varies a driving torque transmitted therebetween. The input shaft 9Ra, the coupling unit 10 and the output shaft 9Rb are connected end to end, and serves as a half axle shaft for the right front wheel 11R. As shown in FIG. 2, the angular drive unit 4 and the coupling unit 10 are both enclosed in a transfer case 13.

The coupling unit 10 is provided in the second lateral side axle shaft for driving the second side wheel. The second side is the left or right side on which the coupling unit 10 is positioned, and the first side is the opposite side. In this embodiment, the coupling unit 10 is located on the right side of the front (first) differential unit 3, and therefore, the second side is the right side. The angular drive unit 4 is disposed between the front differential unit 3 and the coupling unit 10, as shown in FIG. 1. The axes of the front differential case 3a, the ring gear 4c, the input and output shafts 9Ra and 9Rb and the coupling unit 10 are all in alignment. The input shaft 9Ra of the right front axle shaft assembly 9R is coaxially received in the hollow input shaft 4a of the angular drive unit 4. The ring gear 4c of the angular drive unit 4 is positioned between the front differential unit 3 and the coupling unit 10. coupling unit 10.

The coupling unit 10 of this embodiment is an orifice coupling unit. As shown in FIG. 2, the orifice coupling unit 10 is enclosed in a hollow assembly comprising the hollow input shaft 4a and the ring gear 4c of the angular gear unit 4. This hollow assembly is rotatably supported by bearings on both of the left and right sides of the ring gear 4c. Therefore, the angular drive unit 4 comprises a first bearing, provided on the inboard side of the ring gear 4c between the hollow assembly and the transfer case 13, for supporting the hollow assembly, and a second bearing provided on the outboard side of the ring gear 4c between the hollow assembly and the transfer case 13.

The orifice coupling unit 10 has a rotor 10a and a cam housing 10b. The rotor 10a is drivingly connected with the input shaft 9Ra. The cam housing 10b is drivingly connected with the output shaft 9Rb. The rotor 10a is rotatably received in a cavity of the housing 10b. The rotor 10a and housing 10b are coaxial with each other. The housing 10b has an inside cam surface facing radially inwardly. The rotor 10a has a plurality of radial bores extending radially, and opening toward the cam surface of the housing 10b. The radial bores are arranged in a circle at equal angular intervals. In each of the radial bores of the rotor 10a, a driving radial piston 10c is slidably received. Each driving piston 10c has a shank slidably received in the corresponding radial bore of the rotor 10a, a top which projects from the bore and abuts on the cam surface of the housing 10b, and a bottom which defines a cylinder chamber 10d with the bottom and side wall of the bore. When the rotor 10a rotates relative to the housing 10b, each piston 10c reciprocates along a radial direction of the rotor 10a while the top of the piston 10c slides on the cam surface. Each piston 10c increases and decreases the volume of the corresponding cylinder chamber 10d by reciprocating. Each cylinder chamber 10d is connected to an accumulator chamber 10e through a passage having an orifice 10f for restricting a fluid flow. The orifice coupling unit 10 of this example further includes a mechanism 10e for varying the opening areas of the orifices 10f and an actuator 10h for actuating the mechanism 10e.

A controller 10i is connected with the actuator 10h, and designed to control the orifice opening in accordance with signals sent from a group of sensors 10j for sensing operating conditions of the vehicle. The controller 10i varies the opening areas of the orifices 10f in accordance with signals supplied from the sensor group 10j.

Various orifice coupling units are disclosed in prior art documents. Some examples are U.S. Pat. Nos. 4,921,085; 4,958,711 and 4,957,473. Explanations and figures of these document about orifice couplings are herein incorporated by reference.

The four wheel drive system of this embodiment controls the driving force distribution as follows:

(1) When the front and rear wheel speed difference is equal to zero:

When the vehicle is in a constant speed motion on a high $\mu$ road, for example, there arises no speed difference between the front and rear wheels. In such a situation, there is no relative rotation between the input and output shafts 9Ra and 9Rb of the right front axle shaft assembly 9R. The input shaft 9Ra rotates together with the front differential case 3a which is driven by the final reduction gear 2a of the transmission 2. A speed increasing ratio of the angular gear unit 4 is set equal to a speed reducing ratio of the rear differential assembly 6. Therefore, the front differential case 3a and the rear wheels 8L and 8R rotate at the same speed. A rotational speed difference between the left front axle shaft 9L and the input shaft 9Ra of the right axle shaft assembly 9R is absorbed by rotation of pinions 3b of the front differential unit 3. On the other hand, the output shaft 9Rb and the right front wheel 11R rotate together.

In the orifice coupling unit 10, therefore, the rotor 10a and the housing 10b rotate together with no relative rotation therebetween, so that the volumes of the cylinder chambers 10d remain changeless. In this state, the orifice coupling unit 10 transmits no driving torque. A driving force from the engine 1 is transmitted to the rear wheels 8L and 8R through the transmission 2→the front differential case 3a→the angular drive unit 4→the propeller shaft 5→the rear differential assembly 6→the left and right axle shafts 7L and 7R. None of the engine driving force is transmitted to the front wheels 11L and 11R.

(2) When the front and rear wheel speed difference arises:

The rotational speed difference between the front and rear wheels is increased by a drive wheel slip in starting or hard acceleration, or on a slippery or low $\mu$ road surface. In this case, the input and output shafts 9Ra and 9Rb of the right front axle shaft assembly 9R rotate relative to each other, and the orifice coupling unit 10 produces a transmission torque corresponding to the rotational speed difference between the input and output shafts 9Ra and 9Rb. The relative rotation between the input and output shafts 9Ra and 9Rb causes relative rotation between the rotor 10a and the housing 10b of the orifice coupling unit 10, and reciprocation of the driving pistons 10c. During a centripetal stroke toward the center axis of the rotor, each driving piston 10c tries to reduce the volume of the corresponding cylinder chamber 10d, and on the other hand, the corresponding orifice 10f restricts the outflow of the fluid from the cylinder chamber 10d. As a result, the fluid pressure in the cylinder chamber 10d is increased, and each piston 10c is pushed radially outwardly by a hydraulic force obtained by multiplying the fluid pressure in the cylinder chamber 10d by a pressure receiving area of the piston 10c. This force pressing each piston 10c against the cam surface is converted into a torque transmitted through the orifice coupling unit 10. Therefore, torque is transmitted from the front differential case 3a through the orifice coupling unit 10 to the right front wheels 11R.

In general, a differential gear has a function to divide a transmission torque equally. Therefore, the front differential unit 3 transmits an equal amount of torque to the left front axle shaft 9L while the right front wheel 11R is driven through the coupling unit 10. The driving torque of the engine 1 is transmitted to the left and right front wheels 11L and 11R through the transmission 2, the left and right side gears 3L and 3R of the front differential unit 3, and the left and right front axle shafts 9L and 9R. The amount of the driving force transmitted to each front wheel corresponds to the torque transmitted through the orifice coupling unit 10.

The orifice coupling 10 of this embodiment varies a transmission torque transmitted therethrough as shown in FIG. 3. The gain of a characteristic shown in FIG. 3 is made higher as the orifice opening is decreased, and made lower as the orifice opening is increased. The driving torque transmitted to the front wheels is increased steeply in accordance with the front and rear wheel speed difference when the opening degree of the orifices 10f is small. Therefore, by controlling the opening of the orifices 10f in accordance with the operating conditions of the vehicle, this four wheel drive system can control the driving force distribution properly from the two wheel drive state in which the distribution ratio of the share allotted to the front wheels to the rear wheels' share is 0:100, to the four wheel drive state in which is the distribution ratio is 50:50. This four wheel drive system can improve the safety and driving ability of the vehicle on slippery and rough roads by decreasing the opening of the orifices 10f to increase the tendency to the four wheel drive state. This system can ensure desirable cornering performances by increasing the opening of the orifices to increase the tendency to the two rear wheel drive state and to prevent undesired tight corner braking.

In the thus-constructed four wheel drive system, the angular drive unit 4 is provided between the front differential unit 3 and the coupling unit 10, and the orifice coupling is employed as a means for controlling the torque distribution. Therefore, the transfer mechanism is very compact and light in weight. Specifically, the orifice coupling is very advantageous in size and weight reduction, as compared with a multiple disc clutch operated by a hydraulic pressure. In the present invention, transaxle cases and front differentials for FF vehicles can be used with only minor modifications for 4WD vehicles.

In the present invention, the power unit may be mounted at the rear of the vehicle, and the power train may be arranged so that the front wheels are permanent drive wheels. It is possible to employ fixed orifices instead of the variable orifices 10f of the illustrated embodiment.

What is claimed is:

1. A four wheel drive system for a vehicle, comprising:
   a transverse power unit comprising an engine and a transmission, said power unit being transversely mounted on the vehicle;
   a first differential unit connected with an output member of said transmission, said first differential unit comprising a differential case, and first and second side gears;
   an angular drive unit which comprises input and output members rotating on respective nonparallel axes and which transmits rotation from said input member to said output member of said angular drive unit, said input member of said angular drive unit being connected with said differential case of said first differential unit;
   a propeller shaft connected with said output member of said angular drive unit;
   first and second side permanent drive wheels of the vehicle;
   a second differential assembly for dividing a driving torque transmitted through said propeller shaft between said first and second side permanent drive wheels;
   first and second side nonpermanent drive wheels;
   a first side nonpermanent drive axle shaft connecting said first nonpermanent drive wheel with said first side gear of said first differential unit; and
   a second side nonpermanent drive axle assembly connecting said second side nonpermanent drive wheel with said second side gear of said first differential unit, and varying a driving torque transmitted from said second side gear of said first differential unit to said second side nonpermanent drive wheel, said second side nonpermanent drive axle assembly comprising an input shaft connected with said second side gear of said first differential unit, an output shaft connected with said second nonpermanent drive wheel, and an orifice coupling unit for connecting said input shaft of said second side axle assembly with said output shaft of said second side axle assembly, and varying a torque transmitted from said input shaft of said second side axle assembly to said output shaft of said second side axle assembly.

2. A four wheel drive system according to claim 1 wherein said orifice coupling unit comprises a rotary housing having an inside cam surface facing radially inwardly, a rotor rotatably received in said housing, a plurality of radial pistons each of which comprises a shank slidably received in a radial bore formed in said rotor, a top abutting on said cam surface of said housing, and a bottom defining a fluid chamber in said radial bore of said rotor, and a fluid flow regulating means for regulating an outflow of a fluid from each of said fluid chambers, said fluid flow regulating means comprising an orifice.

3. A four wheel drive system according to claim 2 wherein said angular drive unit is disposed between said first differential unit and said orifice coupling unit.

4. A four wheel drive system according to claim 3 wherein said angular drive unit comprises an output gear which rotates on an axis extending along a longitudinal axis of the vehicle, and which is connected with said propeller shaft, and an input gear which is in direct contact and engagement with said output gear, said input gear being connected with said differential case of said first differential unit so that said input gear is driven by said differential case of said first differential unit, said input gear of said angular drive unit being rotatable on an axis which is in line with an axis of said differential case of said first differential unit.

5. A four wheel drive system according to claim 4 wherein said power unit is transversely mounted at a front portion of the vehicle, said permanent drive wheels are rear wheels of the vehicle, said nonpermanent drive wheels are front wheels of the vehicle, and said first differential unit, said angular drive unit and said coupling unit are all disposed between said front wheels of the vehicle.

6. A four wheel drive system according to claim 5 wherein said input shaft of said second side nonpermanent drive axle assembly is disposed on an inboard side of said coupling unit, and connected with said rotor of said coupling unit; and said output shaft of said second side nonpermanent drive axle assembly is disposed on an outboard side of said coupling unit, and connected with said rotary housing of said coupling unit.

7. A four wheel drive system according to claim 6 wherein said input member of said angular drive unit is a hollow shaft in which said input shaft of said second side nonpermanent drive axle assembly is coaxially arranged, and said input gear of said angular drive unit is fixed to said input member of said angular drive unit so as to form a hollow assembly enclosing said coupling unit.

8. A four wheel drive system according to claim 7 further comprising a controller for controlling an opening degree of said orifice by sending an electric control signal to said fluid flow regulating means of said orifice coupling unit.

9. A four wheel drive system according to claim 7 wherein said angular drive unit comprises a first bearing for rotatably supporting said hollow assembly of said angular drive unit on a first side of said input gear of said angular drive unit and a second bearing for rotatably supporting said hollow assembly of said angular drive unit on a second side of said input gear of said angular drive unit which is opposite to said first side.

10. A four wheel drive system according to claim 9 wherein said transmission and said first differential unit are enclosed in a transaxle case, and said angular drive unit and said orifice coupling unit are enclosed in a transfer case.

11. A four wheel drive system for a vehicle, comprising:
   a transverse power unit transversely mounted on the vehicle;
   a first differential unit comprising a differential case drivingly connected with said power unit so that said differential case is driven by said power unit, and first and second side gears;
   an angular gear unit comprising an input ring gear which rotates on an axis extending along a lateral axis of the vehicle and which is drivingly connected with said differential case of said first differential unit so that said input ring gear is driven by said power unit through said differential case of said first differential unit, and an output pinion gear which rotates on an axis extending along a longitudinal axis of the vehicle and which is in direct engagement with said input ring gear;
   a propeller shaft which extends along the longitudinal axis of the vehicle, and drivingly connected with said output pinion gear of said angular gear unit;
   a second differential assembly, disposed between left and right permanent drive wheels of said vehicle, for dividing a driving torque transmitted through said propeller shaft between said left and right permanent drive wheels;
   a first nonpermanent drive axle shaft connecting a first nonpermanent drive wheel of the vehicle with said first side gear of said first differential unit; and
   a second nonpermanent drive axle shaft assembly connecting a second nonpermanent drive wheel of the vehicle with said second side gear of said first differential unit, and varying a driving torque transmitted from said second side gear of said first differential unit to said second nonpermanent drive wheel, said second nonpermanent drive axle shaft assembly comprising an inboard input shaft connected with said second side gear of said first differential unit, an outboard output shaft connected with said second nonpermanent drive wheel and aligned with said inboard input shaft, and a coupling unit for connecting said inboard input shaft with said outboard output shaft and varying a driving torque transmitted between said inboard input shaft and said outboard output shaft;
   wherein said input ring gear of said angular gear unit is disposed between said first differential unit and said coupling unit.

12. A four wheel drive system according to claim 11 wherein said input ring gear of said angular gear unit is coaxial with said inboard input shaft of said second nonpermanent drive axle shaft assembly.

* * * * *